(12) United States Patent
Winter (10) Patent No.: US 10,518,238 B2
(45) Date of Patent: Dec. 31, 2019

(54) APPARATUS USING MULTIPLE JETS FOR GAS DELIVERY AND METHODS OF FLUIDIZING

(71) Applicant: SYNTHESIS ENERGY SYSTEMS, INC., Houston, TX (US)

(72) Inventor: John D. Winter, Houston, TX (US)

(73) Assignee: SYNTHESIS ENERGY SYSTEMS, INC., Houston, TX (US)

( * ) Notice: Subject to any disclaimer, the term of this patent is extended or adjusted under 35 U.S.C. 154(b) by 1282 days.

(21) Appl. No.: 14/210,438

(22) Filed: Mar. 14, 2014

(65) Prior Publication Data

US 2014/0269157 A1 Sep. 18, 2014

Related U.S. Application Data

(60) Provisional application No. 61/786,599, filed on Mar. 15, 2013.

(51) Int. Cl.
| | | |
|---|---|---|
| *B01J 8/00* | (2006.01) | |
| *B01J 8/44* | (2006.01) | |
| *B01J 8/24* | (2006.01) | |
| *B01J 8/18* | (2006.01) | |
| *C10J 3/48* | (2006.01) | |

(52) U.S. Cl.
CPC ............... *B01J 8/44* (2013.01); *B01J 8/1827* (2013.01); *B01J 8/24* (2013.01); *C10J 3/482* (2013.01); *B01J 2208/00902* (2013.01); *B01J 2208/00991* (2013.01); *C10J 2200/152* (2013.01); *C10J 2300/0959* (2013.01); *C10J 2300/0976* (2013.01)

(58) Field of Classification Search
CPC ........ F22B 31/0023; F23C 10/14; F23G 5/46; B01J 8/44; B01J 8/1827; B01J 8/24; B01J 2208/00902; B01J 2208/00991; C10J 3/482; C10J 2200/152; C10J 2300/0959; C10J 2300/0976
See application file for complete search history.

(56) References Cited

U.S. PATENT DOCUMENTS

| | | | | |
|---|---|---|---|---|
| 3,053,642 | A * | 9/1962 | Huntley ................. | B01J 8/1827 34/583 |
| 4,135,889 | A * | 1/1979 | Mori ........................ | B01J 8/245 201/31 |
| 4,879,958 | A * | 11/1989 | Allen ........................ | B01J 8/386 110/245 |
| 5,313,913 | A * | 5/1994 | Ohshita ............... | F22B 31/0092 110/245 |

(Continued)

*Primary Examiner* — Anshu Bhatia
(74) *Attorney, Agent, or Firm* — O'Connor & Company; Ryan P. O'Connor (57) ABSTRACT

The present invention relates to apparatuses for fluidized bed using multiple jets to introduce gas into a fluidized bed region and methods of fluidizing. The apparatus for introducing fluidizing medium to a fluidized bed reactor comprises a vessel defining a fluidized bed region and in which solid feed stock is fed, a gas distribution grid housed in the lower portion of the vessel through which a first fluidizing medium is introduced to fluidize the solid feed stock, a plurality of jets positioned through the gas distribution grid through which a second fluidizing medium is introduced into the fluidized bed region for fluidization of the solid feed stock.

8 Claims, 5 Drawing Sheets

(56) References Cited

U.S. PATENT DOCUMENTS

| | | | |
|---|---|---|---|
| 6,814,940 B1 * | 11/2004 | Hiltunen | B01J 8/0055 422/140 |
| 7,244,399 B2 * | 7/2007 | Myohanen | B01J 8/388 34/582 |

* cited by examiner

APPARATUS USING MULTIPLE JETS FOR GAS DELIVERY AND METHODS OF FLUIDIZING

CROSS-REFERENCE TO RELATED APPLICATIONS

This application claims the benefit of U.S. Provisional Application No. 61/786,599, filed Mar. 15, 2013, which is incorporated by reference herein in its entirety.

FIELD OF THE INVENTION

The present invention relates to fluidized beds using a fluidized bed reactor. More specifically, the invention relates to apparatuses for a fluidized bed using multiple jets to introduce gas into a fluidized bed region and methods of fluidizing.

BACKGROUND OF THE INVENTION

Coal gasification is the process to convert carbonaceous materials such as coal into syngas or synthesis gas primarily containing carbon monoxide (CO) and hydrogen ($H_2$). The Synthesis Energy Systems fluidized bed gasifier ("SES gasifier"), described in e.g. U.S. patent application Ser. No. 13/532,769, is commonly used for the gasification of carbonous materials.

Figure 1:
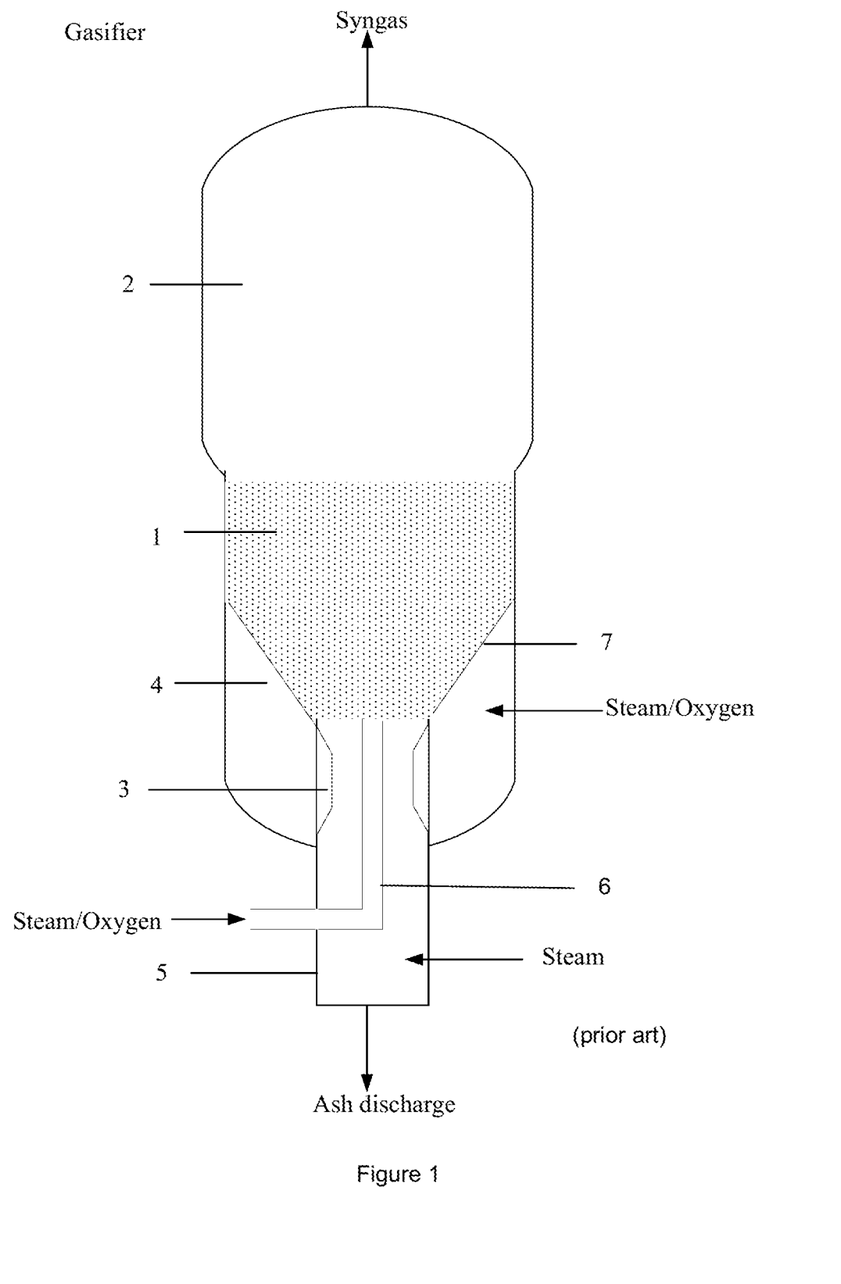
FIG. 1 illustrates the basic structure of a fluidized bed gasifier in the art.

FIG. 1 illustrates the basic structure of an SES fluidized bed gasifier, which comprises a vessel housing a headspace 2 above a fluidized bed 1 of the solid material being gasified, and below the bed a conical perforated gas distribution grid 7 through which the gasifying medium is introduced at sufficient velocity to fluidize the solid feed material in the gasifier. Carbonous feed stock, usually as small particles, is delivered just above the gas distribution grid 7. Steam and oxidant (either air or oxygen) are delivered from under the gas distribution grid 7 to fluidize and partially oxidize the solid feed stock.

Immediately underneath the grid, and above other structures, which are usually one or more additional vessels, for ash cooling and processing etc., is an empty "plenum" space 4. The gasifying medium (steam and/or oxygen) is introduced into the gasifier from the plenum space 4 through the gas distribution grid 7.

A passage such as a pipe 6 ("center jet pipe") in the center region at the bottom of the grid cone introduces oxidant with diluting gas to the bed. Gas velocity of the centre jet pipe 6 is normally greater than the average superficial velocity of gas in the fluidized bed 1. An ash discharge device 5 comprising an annular passage is provided around this center jet pipe for coal ash agglomerated withdrawal and also for provision of additional gas, such as steam, which may serve to cool and protect the center jet pipe 6. The ash discharge device 5 is often configured to comprise a venturi 3 device for sorting the ash particles at the upside of the passage.

The high velocity center jet is an important feature of the existing gasifier as shown in FIG. 1. The gas stream provided through the center jet pipe to the fluidized bed contains a higher oxygen concentration than oxygen concentration provided through the gas distribution grid. This higher oxygen concentration causes more oxidization of the feed stock in the center region of the fluidized bed, and thus the center region has a higher temperature compared to the rest of the bed.

Figure 2:
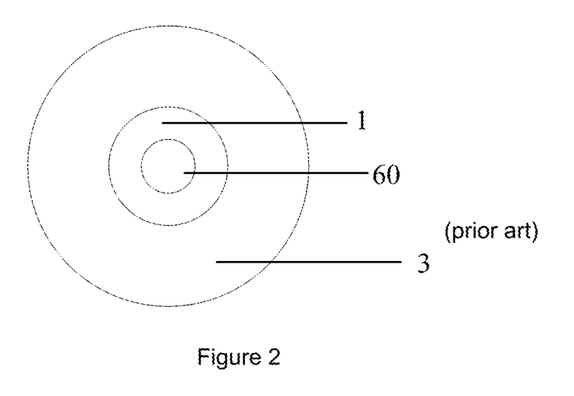
FIG. 2 is a top view of the inside bottom of the vessel in a fluidized bed gasifier in the art.

FIG. 2 is a top view of the inside bottom of the vessel, showing an annular space 1 in the center of the conical gas distribution grid 3 formed as the ash discharge pipe through which ash falls down out of the gasifier, and the inlet holes of the centre jet pipe 60 through which gas stream is provided to the fluidized bed.

It is generally desired for the gasifier to be operated at as high a capacity as possible. Increasing the rate at which the feed stock is delivered to the fluidized bed region is the most common way to increase gasifier capacity. Increased feedstock "intake" results in increased fluidized bed depth, and correspondingly, the amount of steam and oxidant needed also must be increased, to both keep the bed fluidized and to ensure sufficient oxidation occurs so as to maintain the operation temperature of the gasifier.

However, due to the limitation of the gas throughput of the gas distribution grid holes, more fluidized gas needs to be delivered through the center jet pipe. As a consequence, the center high temperature region may have a higher than optimal temperature, resulting in excessive ash agglomeration, large ash particles which disrupt ash discharge from the gasifier. In order to prevent such excessive ash agglomeration, the amount of gas delivered through the center jet pipe must be lowered, but this leads to a lowering the operating temperature of the gasifier which would in turn lead to lower conversion rate of the feed to the gasifier.

Furthermore, increasing amount of gas delivery through the center jet pipe necessarily means that the gas velocity is increased, resulting in a disproportionally larger center jet penetration depth. If this penetration depth is larger than the bed depth, the gas will not be able to mix effectively with the particles in the bed, lowering the gasification efficiency.

Another problem facing the above gasifier is the repair or maintenance of the fluidized bed grid and the center jet pipe 6. To repair or maintain this center jet pipe 6, the ash discharge device 5 must first be removed which is difficult because of the additional vessels connected below the ash discharge device.

Therefore, there is a need to have a system and a method to solve the problems of the center jet pipe, without loses of gasifier performance and maintenance.

SUMMARY OF THE INVENTION

As discussed above, the present invention relates to an improved apparatus and method to provide a fluidizing medium to a fluidized bed region. According to the first aspect of the present invention, the apparatus of the present invention for introducing fluidizing medium to a fluidized bed reactor comprises a vessel defining a fluidized bed region and in which solid feed stock is fed, a gas distribution grid housed in the lower portion of the vessel through which a first fluidizing medium is introduced to fluidize the solid feed stock, a plurality of jets positioned through the gas distribution grid through which a second fluidizing medium is introduced into the fluidized bed region for fluidization of the solid feed stock.

In one embodiment of the apparatus, the plurality jets are symmetrically spaced from the center of the gas distribution grid.

In one embodiment of the apparatus, the apparatus further comprises a distribution header, and wherein each of the plurality of jets is connected to the distribution header and the distribution header is connected to the source of the second fluidizing medium.

In one embodiment of the apparatus, a plenum space is under the gas distribution grid and the distribution header is placed in the plenum space.

In one embodiment, each of the plurality of jets is connected to the distribution header with flanges.

In one embodiment of the apparatus, the second fluidizing medium comprises a high oxygen concentration gas. and the high oxygen concentration gas comprises oxygen, or a mixing gas of oxygen and steam.

In one embodiment, the gas velocity of each of the plurality of jets is greater than the average superficial velocity of gas in the fluidized bed.

According to the second aspect of the present invention, some embodiment further provides a fluidized bed reactor comprising an apparatus for introducing fluidizing medium according to the first aspect of this invention. In one embodiment, the fluidized bed reactor may be a coal gasifier.

According to the third aspect of the present invention, some embodiment provides a method of fluidizing comprising introducing a second fluidizing medium into a fluidized bed region through a plurality of jets for fluidization of the solid feed stock, wherein the fluidized bed region is defined by a vessel in which solid feed stock is fed, and a gas distribution grid is housed in the lower portion of the vessel through which a first fluidizing medium is introduced to fluidize the solid feed stock, and the plurality of jets are connected to a source of fluidizing medium and placed through the gas distribution grid.

In one embodiment of method, the plurality jets are symmetrically spaced from the center of the gas distribution grid.

In one embodiment of method, each of the plurality of jets is connected to a distribution header and the distribution header is connected to the source of the second fluidizing medium.

In one embodiment of method, a plenum space is under the gas distribution grid and the distribution header is placed in the plenum space.

In one embodiment of method, each of the plurality of jets is connected to the distribution header with flanges.

In one embodiment of method, the gas velocity of each of the plurality of jets is greater than the average superficial velocity of gas in the fluidized bed.

The above-mentioned and other features of this invention and the manner of obtaining and using them will become more apparent, and will be best understood, by reference to the following drawing and description.

BRIEF DESCRIPTION OF THE DRAWING

FIG. 6 illustrates another specific embodiment of the present invention, wherein FIG. 6 shows in more detail the construction of pipes connecting with a plurality of jets for delivery of gas stream into the fluidized bed region.

DESCRIPTION OF THE INVENTION

Figure 3:
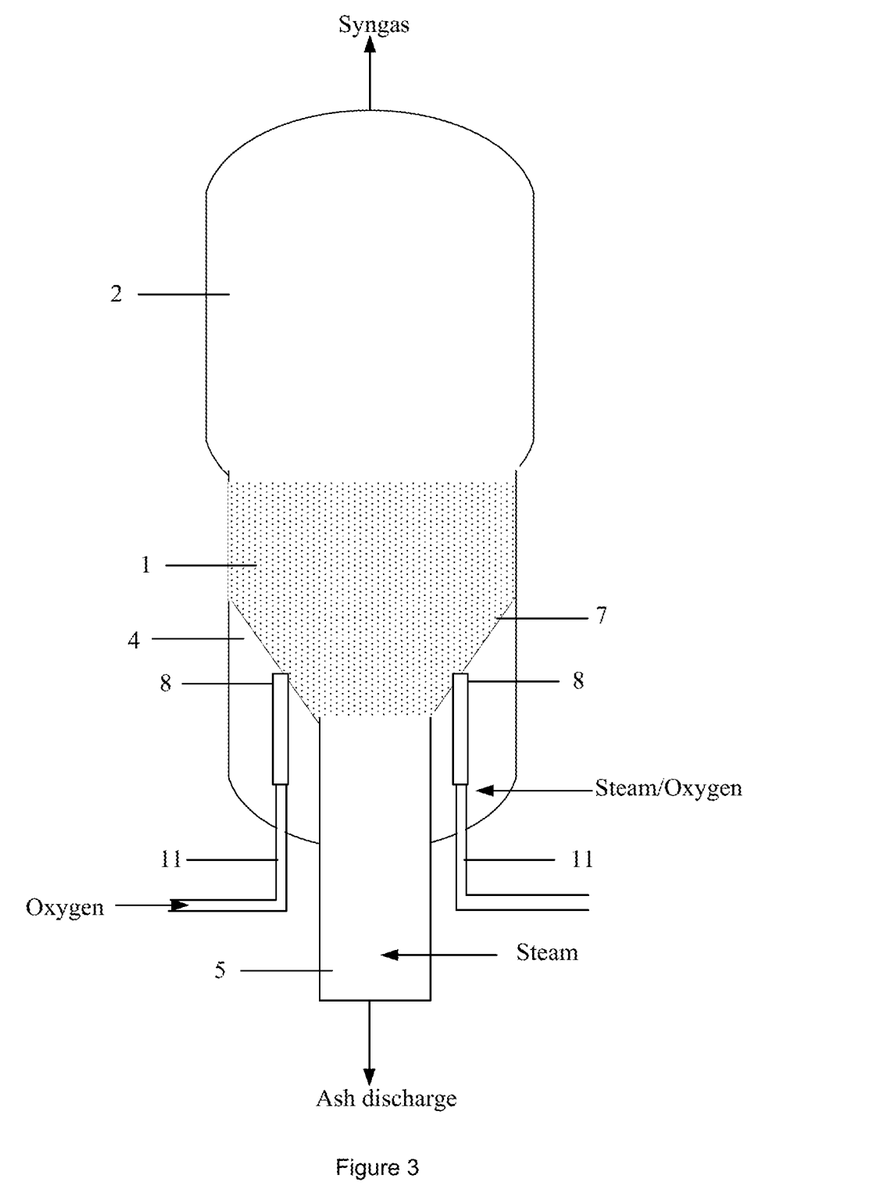
FIG. 3 illustrates one specific embodiment of the present invention with a plurality of jets for delivery of gas stream into the fluidized bed region.

FIG. 3 illustrates one specific embodiment of the present invention. According to one embodiment of the apparatus for introducing fluidizing medium to a fluidized bed reactor, the fluidized bed gasifier comprises a vessel housing defining a fluidized bed region 1 in which solid feed stock is fed and a headspace 2 above the fluidized bed 1. A gas distribution grid 7 housed in the lower portion of the vessel and defines the bottom surface of the fluidized bed 1. Through the gas distribution grid 7, a first fluidizing medium such as steam and/or oxygen is introduced to fluidize the solid feed stock in the gasifier. Carboneous feed stock such as coal is converted into syngas or synthesis gas primarily containing carbon monoxide and hydrogen is discharged from the top of the vessel.

A plenum space 4 is underneath the gas distribution grid 7 and an ash discharge pipe 5 is positioned at the bottom of the vessel. A plurality of jets 8 are positioned through the gas distribution grid 7 through which a second fluidizing medium is introduced into the fluidized bed region 1 for fluidization of the solid feed stock. The plurality of jets 8 can be connected with a source of fluidizing medium through pipes 11.

The second fluidizing medium, for example, can be a high oxygen concentration gas or an oxidization gas ("oxidant"). The high oxygen concentration gas may comprise oxygen, or mixing gas of oxygen and steam. As illustrated in FIG. 1, conventional gasifier has a center jet pipe 6 used to introduce oxygen to form a high temperature region inside the reactor, resulting in a higher temperature region generally around the oxygen inject nozzle of the center jet pipe. In comparison, by using the multi-jet configuration to displace the center jet pipe, inlets of the higher concentration oxidant spreads out the region over which oxidant is introduced to all regions of the bed. Therefore, the temperature differential between the central jet region and the rest of the bed is lowered, and the temperature of the bed is distributed more evenly as well. Thus, excessive ash agglomeration in a central region which disrupts ash discharge can be avoided.

The first and second fluidizing medium can have the same composition, such as steam, oxygen, or a mixture thereof.

Jet penetration depth is commonly recognized as the height of the jetting region corresponding to the distance from the nozzle or jet at which the dispersion of jet momentum is practically complete. If the jet gas velocity is the same as that of a centre jet pipe, jet gas from smaller diameter jet carries smaller jet momentum, consequently, resulting in weaker penetration ability of the jet gas passing through the bed solids and shorter distance from the jet at which the dispersion of jet momentum is complete. Therefore, by replacing a center jet which is with a wide opening with multiple jets the diameter of each of which is smaller than that of the center jet pipe, can also lead to decreased jet penetration depth, avoiding the jet penetration depth being greater than the fluidized bed depth.

Jet momentum increases as jet gas velocity. Increased jet momentum strengths penetration ability of the jet gas passing through the bed solids, thus brings longer distance from the jet at which the dispersion of jet momentum is complete, leading to greater jet penetration depth. Since the diameter of multiple jets is smaller, the gas velocity in each of the plurality of jets can be higher than in the single center jet while maintaining the same jet penetration depth, bringing additional operating flexibility or significantly greater throughput. The gas velocity in the single center jet is usually greater than the average superficial velocity of gas in the fluidized bed. Accordingly, in one embodiment, the gas velocity of each of the plurality of jets can also be greater than the average superficial velocity of gas in the fluidized bed.

It is understood that at the bottom of fluidized bed reactor below the center of the gas distribution grid 7, a constriction can be provided having a fixed opening defining a venturi to perform the classification function.

Figure 4:
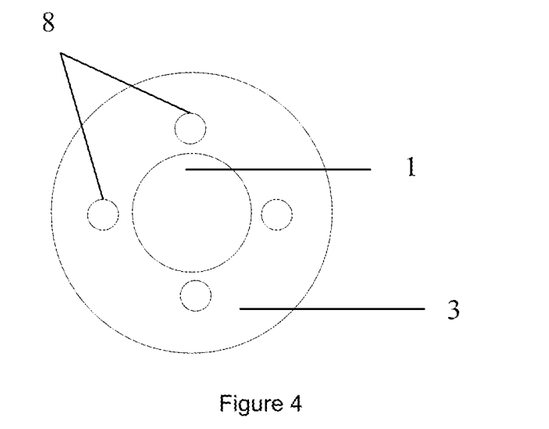
FIG. 4 is a top view of the inside bottom of the vessel in a fluidized bed gasifier according to one embodiment of the present invention, showing the arrangement of a plurality of jets through the gas distribution grid.

FIG. 4 illustrates another example showing the arrangement of a plurality jets according to one embodiment of the present invention. An annular space 1 in the center of the conical gas distribution grid 3 formed as the ash discharge pipe. The plurality jets 8 are symmetrically spaced from the center of the gas distribution grid 3, or spaced symmetrically from the vertical centerline of the gasifier. Nevertheless, the plurality jets can also be spaced asymmetrically from the center of the gas distribution grid.

Figure 5:
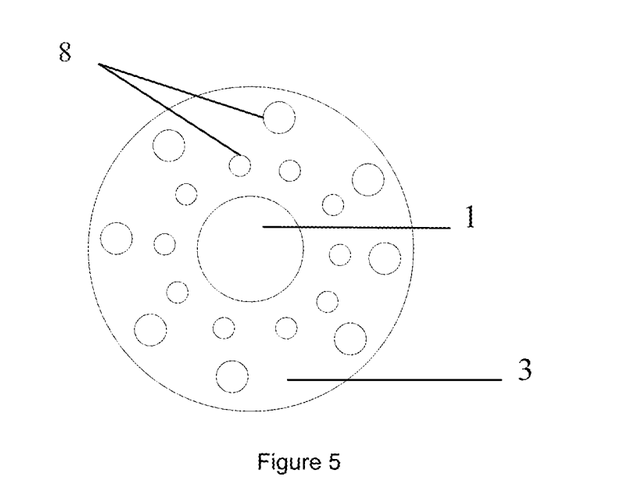
FIG. 5 is a top view of the inside bottom of the vessel in a fluidized bed gasifier according to another embodiment of the present invention, showing the arrangement of a plurality of jets through the gas distribution grid.

FIG. 5 illustrates another example showing the arrangement of a plurality jets according to one embodiment of the present invention. The plurality jets 8 can be arranged in two or more rows (such as arranged in two circles as shown in FIG. 5) spaced from the center of the gas distribution grid 3.

The total number and spacing pattern of the jets 8 can be designed to provide a complete and uniform coverage for the entire area of the fluidized bed region. The diameter (or hole size) of the jets can be designed to according to the total number of jets, the spacing pattern and the size of the grid. For example, the diameter of the jets may range from 3 to 20 mm. The diameter of the jets can be the same or different.

In one embodiment, the velocities of the gas in each of the plurality of the jets would be maintained close to it used in a single center jet pipe, so that the mixing energy provided by the center jet remains similar. The second fluidizing medium gas flows through the jets at a velocity and provides a penetrating jet into the fluidized bed to keep the feed solids in a fully suspended or fluidized state.

As showing in FIG. 3, preferentially each of the multiple jets would have an annular gas 11 provided similar to that provided for the single center jet.

Figure 6:
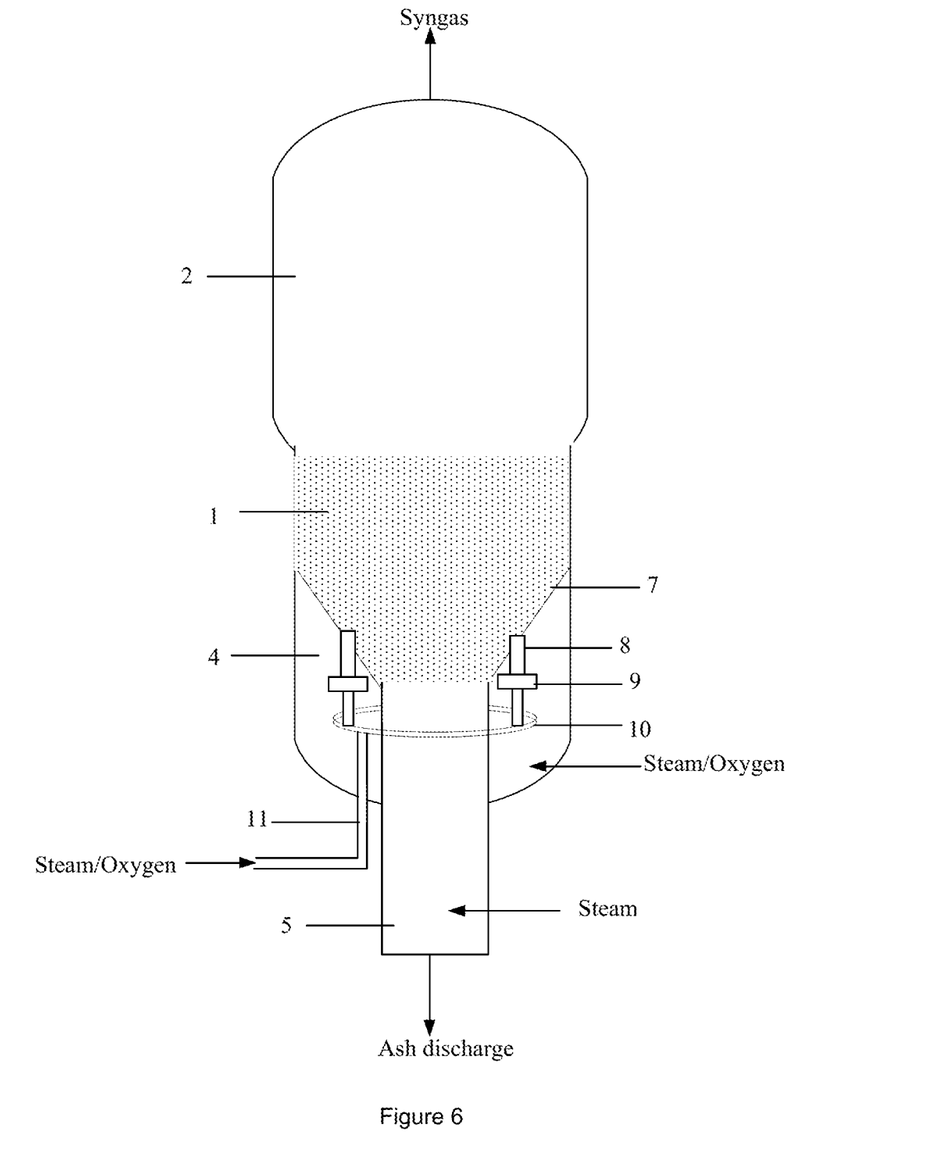

FIG. 6 illustrates another specific embodiment of the present invention, showing in more detail the construction of pipes connecting with a plurality of jets. In the embodiment, the apparatus further comprises a distribution header 10 and each of the plurality of jets 8 is connected to the distribution header 10 and the distribution header 10 can be connected to a source of the second fluidizing medium through a pipe 11.

The piping to the multiple jets 8 is provided simply with connections such as flanges 9 to the distribution header 10 within the plenum space 4. Since this plenum space 4 is large enough for vessel entry and the area is provided with a man-way, access to repair or replace the multiple jets 8 is provided without having to move or remove any of the heavy and bulky ash discharge system components. However, in the convention, the center jet is normally located inside the annular space or the venturi device, which is structurally connected to the rest of the gasification system, such as ash cooling and sorting components. Replacement or maintenance of the center jet is complicated to exercise in the art.

As discussed above, the multi-jet configuration for a fluidized bed reactor of the present invention has at least the following desirable effects avoiding the jet penetration depth being greater than the fluidized bed depth and easier access for repair or maintenance of the jets for gas delivery. As disused above, in some embodiment, oxidant is introduced into a fluidized bed reactor through the multi-jet configuration, which lowers the temperature differential between the central region of the bed and the rest of the bed so that excessive ash agglomeration in a central region which disrupts ash discharge can be avoided.

According to another aspect of the present invention, a method of fluidizing is provided. In one embodiment of the method, it comprises introducing a second fluidizing medium into a fluidized bed region through a plurality of jets for fluidization of the solid feed stock, wherein the fluidized bed region is defined by a vessel in which solid feed stock is fed, and a gas distribution grid is housed in the lower portion of the vessel through which a first fluidizing medium is introduced to fluidize the solid feed stock, and the plurality of jets are connected to a source of fluidizing medium and placed through the gas distribution grid.

In one embodiment of the method, the plurality jets are symmetrically spaced from the center of the gas distribution grid. The gas velocity of each of the plurality of jets may be greater than the average superficial velocity of gas in the fluidized bed.

In one embodiment of the method, each of the plurality of jets is connected to a distribution header and the distribution header is connected to the source of the second fluidizing medium. A plenum space is under the gas distribution grid and the distribution header is placed in the plenum space, and each of the plurality of jets is connected to the distribution header with flanges.

It is understood that examples and embodiments described herein are for illustrative purpose only and that various modifications or changes in light thereof will be suggested to persons skilled in the art and are to be included within the spirit and purview of this application and scope of the appended claims. All publications, patents and patent applications cited in this patent are hereby incorporated by reference for all purposes.

One or more features from any embodiment maybe combined with one or more features of any other embodiment without departing from the scope of the disclosure. The above description is illustrative and is not restrictive. Many variations of the invention will become apparent to those skilled in the art upon review of the disclosure. The scope of the invention should, therefore, be determined not with reference to the above description, but instead should be determined with reference to the claims along with their full scope or equivalents.

What is claimed is:

1. An apparatus for introducing fluidizing gas to a fluidized bed reactor, comprising:
    a vertical vessel having a lower portion and defining a fluidized bed region and in which solid feed stock is fed,
    a conically shaped perforated gas distribution grid housed in the lower portion of the vessel through which a first fluidizing medium is introduced to fluidize the solid feed stock, wherein the fluidized bed region is immediately above and a plenum space is immediately underneath the conically shaped perforated gas distribution grid, and
    a plurality of jets positioned through the conically shaped perforated gas distribution grid through which a second fluidizing medium is introduced into the fluidized bed region for fluidization of the solid feed stock, and a distribution header, wherein each of the plurality of jets is connected to the distribution header, and wherein the distribution header is connected to a source of the second fluidizing medium, wherein the first fluidizing medium and the second fluidizing medium are physically present in the apparatus.

2. The apparatus according to claim 1, wherein the plurality of jets are symmetrically spaced from the center of the conically shaped perforated gas distribution grid.

3. The apparatus according to claim 1, wherein the distribution header is placed in the plenum space.

4. The apparatus according to claim 1, wherein each of the plurality of jets is connected to the distribution header with flanges.

5. The apparatus according to claim 1, wherein the second fluidizing medium comprises a high oxygen concentration gas, and wherein the high oxygen concentration gas comprises oxygen, or a mixing gas of oxygen and steam.

6. The apparatus according to claim 1, wherein the gas velocity of each of the plurality of jets is greater than the average superficial velocity of gas in the fluidized bed.

7. A fluidized bed reactor comprising an apparatus for introducing fluidizing medium to the fluidized bed reactor according to claim 1.

8. The fluidized bed reactor according to claim 7, wherein the fluidized bed reactor is a coal gasifier.

* * * * *